(12) United States Patent
Shimizu

(10) Patent No.: US 7,899,595 B2
(45) Date of Patent: Mar. 1, 2011

(54) VEHICLE OCCUPANT PROTECTION APPARATUS

(75) Inventor: Ryo Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 1039 days.

(21) Appl. No.: 11/711,181

(22) Filed: Feb. 26, 2007

(65) Prior Publication Data

US 2007/0208475 A1  Sep. 6, 2007

(30) Foreign Application Priority Data

Mar. 3, 2006 (JP) .................................. 2006-058149

(51) Int. Cl.
*B60R 11/00* (2006.01)

(52) U.S. Cl. .......................................... 701/45; 280/748

(58) Field of Classification Search .................... 701/45; 280/728.1, 730.1, 734, 735, 801.1, 802, 748; 180/268, 270, 282; 307/10.1, 10.3, 9.1, 121
See application file for complete search history.

(56) References Cited

U.S. PATENT DOCUMENTS

| | | | | |
|---|---|---|---|---|
| 4,873,452 A | * | 10/1989 | Morota et al. | 307/10.1 |
| 5,363,303 A | * | 11/1994 | Kaneko et al. | 701/45 |
| 5,387,819 A | | 2/1995 | Ueno et al. | |
| 5,506,454 A | * | 4/1996 | Hanzawa et al. | 307/10.1 |
| 5,737,961 A | * | 4/1998 | Hanisko et al. | 73/1.38 |
| 6,292,728 B1 | | 9/2001 | Masegi | |
| 6,308,554 B1 | | 10/2001 | Mattes et al. | |

FOREIGN PATENT DOCUMENTS

| | | |
|---|---|---|
| DE | 196 09 290 | 4/1997 |
| JP | 10-044924 | 2/1998 |
| JP | 2003-002157 | 1/2003 |

OTHER PUBLICATIONS

Office Action dated Feb. 4, 2008 in German Application No. 10 2007 008 091.5-21 with English translation thereof.

* cited by examiner

*Primary Examiner* — Dalena Tran
(74) *Attorney, Agent, or Firm* — Harness, Dickey & Pierce, PLC

(57) ABSTRACT

A vehicle occupant protection apparatus includes an occupant protection device, a control unit, and a sensor module. The sensor module includes an acceleration sensor for detecting first acceleration caused by a collision and second acceleration caused by a fault diagnosis of the sensor module, a signal processing circuit for producing first and second data corresponding to the first and second acceleration, respectively, and a signal output circuit for outputting a signal having the first data or the second data to the control unit. The control unit includes a diagnostic unit for performing the fault diagnosis based on the second data and a controller for controlling the protection device based on the first data. The signal output circuit adds a first code to the signal having the first data and adds a second code to the signal having the second data.

4 Claims, 2 Drawing Sheets

VEHICLE OCCUPANT PROTECTION APPARATUS

CROSS REFERENCE TO RELATED APPLICATION

This application is based on and incorporates herein by reference Japanese Patent Application No. 2006-58149 filed on Mar. 3, 2006.

FIELD OF THE INVENTION

The present invention relates to a vehicle occupant protection apparatus for protecting an occupant of a vehicle in the event of a collision.

BACKGROUND OF THE INVENTION

Typically, a vehicle occupant protection apparatus includes a sensor module having an acceleration sensor for outputting an acceleration signal corresponding to acceleration caused by a collision. The occupant protection apparatus detects collision based on the acceleration signal.

In such an occupant protection apparatus, fault diagnosis of the sensor module is performed to ensure proper operation of the apparatus. For example, in an occupant protection apparatus disclosed in JP 2003-2157A, a control section outputs a diagnosis start signal to a sensor module and fault diagnosis of the sensor module is performed in response to the start signal. Then, the sensor module returns a result signal indicating the result of the diagnosis to the control section. The control section determines based on the result signal whether the sensor module is at fault.

The control section cannot distinguish between the acceleration signal and the return signal, because each signal is the same type of signal. Specifically, each of the acceleration signal and the return signal is a voltage signal outputted from the acceleration sensor. Therefore, the control section interprets the first signal, which is inputted to the control section immediately after the control section outputs the start signal to the sensor module, as the result signal.

However, there are fears that the control section misinterprets the return signal as the acceleration signal. Therefore, the control section may activate an occupant protection device (e.g., airbag) despite the fact that the collision does not occur.

SUMMARY OF THE INVENTION

In view of the above-described problem, it is an object of the present invention to provide a occupant protection apparatus in which an acceleration signal and a diagnostic signal can be clearly distinguished from each other to prevent an occupant protection device from being accidentally activated by the diagnostic signal.

An occupant protection apparatus for a vehicle includes an occupant protection device, a control unit, and a sensor module.

The occupant protection device may be, for example, an airbag device or a seat belt pretensioner device to absorb impact applied to an occupant in the event of a collision. The sensor module includes an acceleration sensor for detecting first acceleration caused by the collision, a signal processing circuit for producing first data corresponding to the first acceleration, and a signal output circuit.

The control unit includes a diagnostic unit for performing a fault diagnosis of the sensor module and a controller for controlling the protection device based on the first data and a result of the fault diagnosis.

The diagnostic unit outputs a start signal to the sensor module to perform the fault diagnosis of the sensor module. The sensor module further includes a start circuit for causing the acceleration sensor to detect second acceleration in response to the start signal. For example, the acceleration sensor performs self-vibration, i.e., vibrates itself in response to the start signal to detect the second acceleration. The signal processing circuit produces second data corresponding to the second acceleration.

The signal output circuit of the sensor module outputs a signal having the first data or the second data to the control unit. The diagnostic unit performs the fault diagnosis of the sensor module based on the second data and the controller controls the protection device based on the first data. The signal output circuit adds a first code to the signal having the first data and adds a second code to the signal having the second data.

Thus, the signal having the first data related to the collision and the signal having the second data related to the diagnosis can be clearly distinguished from each other. Therefore, the controller can be prevented from controlling the occupant protection device based on the second data so that the occupant protection device can be prevented from accidentally activated.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
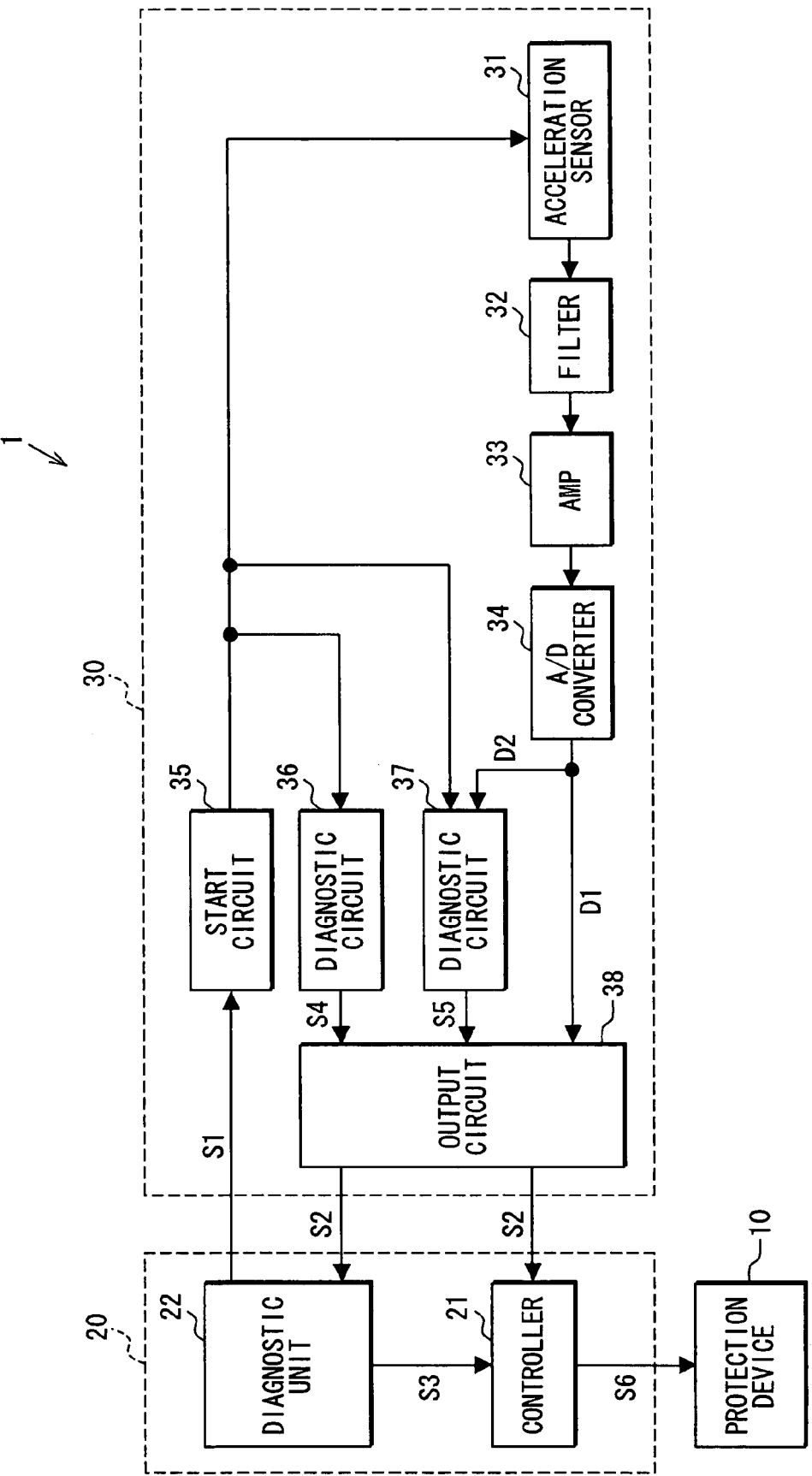
FIG. 1 is a block diagram of a vehicle occupant protection apparatus according to an embodiment of the present invention.

As shown in FIG. 1, an airbag apparatus 1 according to an embodiment of the present invention includes an occupant protection device 10, an electronic control unit (ECU) 20, and a sensor module 30.

The protection device 10 may be, for example, an airbag installed in a steering wheel hub to protect a driver in the event of a frontal collision.

The ECU 20 includes a controller 21 and a diagnostic unit 22. The diagnostic unit 22 outputs a diagnosis start signal S1 to the sensor module 30 to start fault diagnosis of the sensor module 30. The sensor module 30 returns a response signal S2 to the diagnostic unit 22. The diagnostic unit 22 performs the fault diagnosis of the sensor module 30 based on the response signal S2. Then, the diagnostic unit 22 outputs a result signal S3 indicating a result of the diagnosis to the controller 21. The controller 21 activates the protection device 10 based on the response signal S2 and the result signal S3. For example, if the result signal S3 indicates that the sensor module 30 is at fault, the controller 21 does not activate the protection device 10.

The sensor module 30 includes an acceleration sensor 31, a filter circuit 32, an amplifier circuit 33, an analog-to-digital (A/D) converter 34, a start circuit 35, first and second diagnostic circuits 36, 37, and a signal output circuit 38.

The acceleration sensor 31 detects acceleration of a vehicle. For example, the collision vibrates the acceleration sensor 31 and the acceleration sensor 31 detects a first acceleration caused by the collision. Then, the acceleration sensor 31 outputs a first analog signal corresponding to the first acceleration to the filter circuit 32. Also, the acceleration sensor 31 performs self-vibration, i.e., vibrates itself in response to the start signal S1 outputted from the start circuit 35. The acceleration sensor 31 detects a second acceleration caused by the self-vibration and outputs a second analog signal corresponding to the second acceleration to the filter circuit 32. The first and second analog signals are the same type of signal so that the first and second analog signals cannot be distinguished from each other.

The filter circuit 32 eliminates noise components from the first and second analog signals. The amplifier circuit 33 amplifies the filtered first and second analog signals. The A/D converter 34 converts the amplified first and second analog signals to first and second digital data D1, D2, respectively. For example, each of the first and second digital data D1, D2 is a 12-bit data.

The start circuit 35 receives the start signal S1 from the ECU 20 and outputs the start signal S1 to each of the acceleration sensor 31, the first diagnostic circuit 36, and the second diagnostic circuit 37.

Upon receiving the start signal S1, the first diagnostic circuit 36 checks functions of internal devices of the sensor module 30 and diagnoses whether the internal devices operate normally. For example, the internal devices include a read only memory (ROM), which is not shown in the drawings. Then, the first diagnostic circuit 36 outputs a result signal S4 indicating a result of the diagnosis to the output circuit 38.

Upon receiving the start signal S1, the second diagnostic circuit 37 enables input from the A/D converter 34. Thus, the second diagnostic circuit 37 receives the second digital data D2 that is outputted from the A/D converter 34 immediately after the second diagnostic circuit 37 receives the start signal S1. Based on the second digital data D2, the second diagnostic circuit 37 diagnoses whether each of the acceleration sensor 31, the filter circuit, the amplifier circuit 33, and the A/D converter 34 operates normally. For example, the second diagnostic circuit 37 compares the second digital data D2 with a correct data prestored in the ROM. Then, the second diagnostic circuit 37 outputs a result signal S5 indicating a result of the diagnosis to the output circuit 38.

The output circuit 38 receives the first and second digital data D1, D2 from the A/D converter 34 and also receives the result signals S4, S5 from the first and second diagnostic circuits 36, 37, respectively. The output circuit 38 generates the response signal S2 based on the result signals S4, S5 and the digital data D1, D2 and then outputs the response signal S2 to the ECU 20.

Figure 2A:
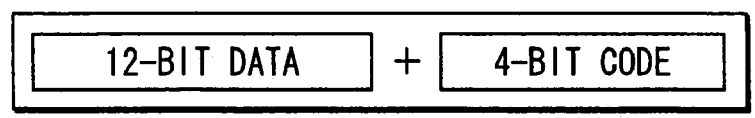
FIG. 2A shows a signal outputted from an output circuit of a sensor module of the occupant protection apparatus of FIG. 1.

The response signal S2 is a 16-bit digital signal. As shown in FIG. 2A, the twelve high-order bits of the response signal S2 is the first digital data D1 or the second digital data D2 and the four low-order bits of the response signal S2 is a 4-bit code.

Figure 2B:
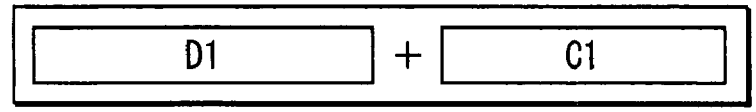
FIG. 2B shows the signal containing first data related to a collision.
Figure 2C:
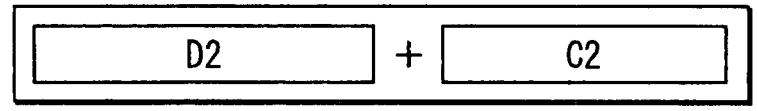
FIG. 2C shows the signal containing second data related to a fault diagnosis.

The code represents whether the response signal S2 includes the first digital data D1 or the second digital data D2. Specifically, as shown in FIG. 2B, when the code is a first code C1, the response signal S2 includes the first digital data D1. For example, the first code C1 is "1010". In contrast, as shown in FIG. 2C, when the code is a second code C2, the response signal S2 includes the second digital data D2. The second code C2 indicates whether the sensor module 30 is at fault. For example, when the second code C2 is "1001", the sensor module 30 operates normally. When the second code C2 is "0110", the sensor module 30 is at fault.

In a first case where the diagnostic unit 22 of the ECU 20 does not output the start signal S1 to the start circuit 35 of the sensor module 30, the output circuit 38 does not receive the result signals S4, S5 from the first and second diagnostic circuits 36, 37, respectively. In this case, the output circuit 38 interprets the digital data received from the A/D converter 34 as the first digital data D1 and generates the response signal S2 consisting of the first digital data D1 and the first code C1 of "1010".

Then, the output circuit 38 outputs the response signal S2 to each of the controller 21 and the diagnostic unit 22 of the ECU 20. The diagnostic unit 22 performs the fault diagnosis of the sensor module 30 only when the code of the response signal S2 is the second code C2. Since the code of the response signal S2 is the first code C1, the diagnostic unit 22 ignores the first digital data D1 and does not perform the fault diagnosis of the sensor module 30 based on the first digital data D1.

In contrast, the controller 21 controls the protection device 10 only when the code of the response signal S2 is the first code C1. Since the code of the response signal S2 is the first code C1, the controller 21 determines based on the first digital data D1 whether the collision occurs. If the controller 21 determines that the collision occurs, the controller 21 outputs a drive signal S6 to the protection device 10. The protection device 10 is activated by the drive signal S6.

In a second case where the diagnostic unit 22 outputs the start signal S1 to the start circuit 35, the output circuit 38 receives the result signals S4, S5 from the first and second diagnostic circuits 36, 37, respectively. In this case, the output circuit 38 interprets the digital data received from the A/D converter 34 as the second digital data D2 and generates the response signal S2 consisting of the second digital data D2 and the second code C2. If both the result signals S4, S5 represent that the sensor module 30 operates normally, the output circuit 38 sets the second code C2 to "1001". If at least one of the result signals S4, S5 represents that the sensor module 30 is at fault, the output circuit 38 sets the second code S2 to "0110".

Then, the output circuit 38 outputs the response signal S2 to each of the controller 21 and the diagnostic unit 22 of the ECU 20. Since the code of the response signal S2 is the second code C2, the diagnostic unit 22 performs the fault diagnosis of the sensor module 30. Specifically, the diagnostic unit 22 determines whether the second code C2 is "1001" or "0110". When the second code C2 is "1001", the diagnostic unit 22 determines that the sensor module 30 operates normally. In contrast, when the second code C2 is "0110", the diagnostic unit 22 determines that the sensor module 30 is at fault. Then, the diagnostic unit 22 outputs the result signal S3 indicating the result of the diagnosis to the controller 21.

The controller 21 ignores the second digital data D2 and does not control the protection device 10 based on the second digital data D2, because the code of the response signal S2 is the second code C2.

Thus, the ECU 20 can accurately determine whether the response signal S2 includes the first digital data D1 related to the collision or the second digital data D2 related to the fault diagnosis. Therefore, the ECU 20 can be prevented from accidentally activating the protection device 10.

(Modifications)

The embodiment described above may be modified in various ways. For example, the protection device 10 may be a seat belt pretensioner or the like.

Such changes and modifications are to be understood as being within the scope of the present invention as defined by the appended claims.

What is claimed is:

1. An apparatus for protecting an occupant of a vehicle in a collision, the apparatus comprising:

an occupant protection device for protecting the occupant;

a sensor module including an acceleration sensor for detecting first acceleration caused by the collision and a processing circuit for producing first data corresponding to the first acceleration; and a control unit including a diagnostic unit for performing a fault diagnosis of the sensor module and for outputting a start signal to the sensor module, the control unit further including a controller for controlling the protection device based on the first data and a result of the fault diagnosis, wherein the sensor module further includes a start circuit for causing the acceleration sensor to detect second acceleration in response to the start signal so that the processing circuit produces second data corresponding to the second acceleration, the sensor module further including an output circuit for outputting a signal having the first data or the second data to the control unit, the output circuit adding a first code to the signal having the second data, and the diagnostic unit determines based on the first code that the signal has the second data and performs the fault diagnosis of the sensor module based on the second data.

2. The apparatus according to claim 1, wherein the output circuit adds a second code different from the first code to the signal having the first data, and the controller determines based on the second code that the signal has the first data and controls the protection device based on the first data.

3. The apparatus according to claim 1, wherein the sensor module further includes a diagnostic circuit for determining whether the acceleration sensor and the processing circuit operates normally or abnormally, and the output circuit changes the first code between when the diagnostic circuit determines that both the acceleration sensor and the processing circuit operate normally and when the diagnostic circuit determines that at least one of the acceleration sensor and the processing circuit operates abnormally.

4. The apparatus according to claim 1, wherein the acceleration sensor performs self-vibration in response to the start signal to produce the second acceleration.

* * * * *